(12) United States Patent
Puranen (10) Patent No.: US 12,130,039 B2
(45) Date of Patent: *Oct. 29, 2024

(54) SYSTEMS AND METHODS FOR REDUCING TEMPERATURE OVERSHOOT OF A HEATING, VENTILATION, AND AIR CONDITIONING SYSTEM

(71) Applicant: Rheem Manufacturing Company, Atlanta, GA (US)

(72) Inventor: Christopher M. Puranen, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,282

(22) Filed: May 4, 2023

(65) Prior Publication Data

US 2023/0272937 A1    Aug. 31, 2023

Related U.S. Application Data

(63) Continuation of application No. 17/551,510, filed on Dec. 15, 2021, now Pat. No. 11,668,487.

(51) Int. Cl.
*F24F 11/65*        (2018.01)
*F24F 11/61*        (2018.01)
(Continued)

(52) U.S. Cl.
CPC .............. *F24F 11/65* (2018.01); *F24F 11/61* (2018.01); *G05B 19/042* (2013.01); *F24F 2110/10* (2018.01); *G05B 2219/2614* (2013.01)

(58) Field of Classification Search
CPC ........ F24F 11/65; F24F 11/61; F24F 2110/10; G05B 19/042; G05B 2219/2614
See application file for complete search history.

(56) References Cited

U.S. PATENT DOCUMENTS

| 5,415,346 A | * | 5/1995 | Bishop ............... G05D 23/1917 |
| | | | 236/78 D |
| 2008/0314998 A1 | * | 12/2008 | Herzon ..................... F24F 11/77 |
| | | | 236/1 C |

(Continued)

FOREIGN PATENT DOCUMENTS

EP          0206165 A1    12/1986

OTHER PUBLICATIONS

PCT, "International Search Report & Written Opinion" Application No. PCT/US2022/052536, dated Mar. 24, 2023 (9 pp.).

*Primary Examiner* — Michael W Choi
(74) *Attorney, Agent, or Firm* — Eversheds Sutherland (US) LLP (57) ABSTRACT

The disclosed technology includes systems and methods for reducing temperature overshoot of a heating, ventilation, and air conditioning (HVAC) system. The disclosed technology can include a thermostat having a temperature sensor and a controller. The controller can be configured to receive temperature data from the temperature sensor, determine whether a time since the heating cycle of the HVAC unit began is greater than or equal to a predetermined amount of time, and determine whether a current temperature is less than or equal to a low threshold temperature, the low threshold temperature being less than a target temperature. If the current temperature is less than or equal to the low threshold temperature, the controller can determine whether a capacity of the HVAC unit at the end of the heating cycle is greater than a threshold capacity and adjust a response setting of the thermostat by a predetermined adjustment amount.

18 Claims, 3 Drawing Sheets

(51) Int. Cl.
  *G05B 19/042* (2006.01)
  *F24F 110/10* (2018.01)

(56) References Cited

U.S. PATENT DOCUMENTS

2012/0065935 A1    3/2012  Steinberg et al.
2020/0263899 A1*   8/2020  Sethuraj .................. F24F 11/70
2023/0003412 A1*   1/2023  Mathew .................. G05B 15/02
2023/0013263 A1*   1/2023  Kewekordes, II .... F24H 15/174

* cited by examiner

FIG. 2
Heating Mode

FIG. 3
Cooling Mode

SYSTEMS AND METHODS FOR REDUCING TEMPERATURE OVERSHOOT OF A HEATING, VENTILATION, AND AIR CONDITIONING SYSTEM

CROSS-REFERENCE TO RELATED APPLICATION

This application is a continuation of U.S. application Ser. No. 17/551,510, filed Dec. 15, 2021, which is hereby incorporated by reference in its entirety.

FIELD OF TECHNOLOGY

The disclosed technology relates generally to systems and methods for reducing temperature overshoot of a heating, ventilation, and air conditioning (HVAC) system.

BACKGROUND

HVAC systems are commonly controlled using a thermostat, which generally includes a temperature sensor capable of detecting the temperature of the air in a climate-controlled space and a controller that is capable of controlling the HVAC system based on the detected temperature to maintain the air temperature within a predetermined temperature range. To help ensure the temperature of the air in the climate-controlled space is maintained within the predetermined temperature range, thermostats are generally installed on a wall in the climate-controlled space such that the temperature sensor detects the temperature of the air in the climate-controlled space.

In some instances, the temperature sensor of the thermostat can detect a temperature of the air near the thermostat that is not representative of the temperature of the rest of the air within the climate-controlled space. For example, if the thermostat is installed too closely to a supply air vent or a return air vent, the detected temperature of the air may be different from the temperature of the air in the rest of the climate-controlled space. This can happen, for example, if the thermostat detects the temperature of the air that is supplied from an air duct that passes through a space that is not climate controlled (e.g., an attic, a crawl space, within the walls of a home, etc.). When the HVAC system is operating in a heating mode, the stagnant air within the air duct can be substantially cooler than the temperature of the air within the climate-controlled space. Alternatively, when the HVAC system is in a cooling mode, the stagnant air within the air duct can be substantially warmer than the temperature of the air within the climate-controlled space. Regardless, the stagnant air (which has a temperature substantially different from the air within the climate-controlled space) can be supplied from the air duct before the heated (or cooled) air is supplied from the HVAC system. Thus, when the HVAC system receives a start signal and begins circulating air to the climate-controlled space, the column of cool (or warm) stagnant air from the air duct can be delivered near the thermostat, causing the thermostat to detect an air temperature that is lower (or higher) than the air temperature within the rest of climate-controlled space. When this occurs, the controller of the thermostat will interpret the temperature data as indicating that the temperature within the climate-controlled space is much lower (or higher) than it actually is and begin outputting a greater amount of heated air (or cooled air) than is actually required. In some cases, the thermostat can cause the HVAC system to heat the climate-controlled space to more than five degrees above (or below) the target temperature, resulting in an inefficient use of the HVAC system and an uncomfortable climate for an occupant of the climate-controlled space.

Some existing thermostats include an adjustment mechanism, such as an adjustment screw for mechanical thermostats or a gain adjustment option for digital controllers, to help to alleviate the amount of overshoot that can occur as a result of the thermostat being installed in a less than ideal location. Unfortunately, existing systems require a user to manually adjust the gain (e.g., by turning the adjustment screw on a mechanical controller or by adjusting the gain on a digital controller) and then wait for a heating (or cooling) cycle to be completed before the effect of the adjustment can be observed. Adjusting the gain is generally an iterative process and can be time consuming, often requiring multiple heating or cooling cycles to adjust the gain to the right setting. Furthermore, once the gain is adjusted, the response of the thermostat can drift over time, requiring additional manual adjustment by a user to ensure the thermostat and HVAC system properly heat and cool the climate-controlled space.

What is needed, therefore, is a system and method of reducing the amount of temperature overshoot that can occur as a result of a thermostat detecting an air temperature that is not representative of the air temperature in the rest of the climate-controlled space to ensure the HVAC system properly heats or cools the climate-controlled space. These and other problems are addressed by the technology disclosed herein.

SUMMARY

The disclosed technology relates generally to systems and methods for reducing temperature overshoot of a heating, ventilation, and air conditioning (HVAC) system. The disclosed technology can include a thermostat for an HVAC system. The thermostat can include a temperature sensor configured to detect a temperature of air proximate the thermostat and a controller. The controller can be configured to receive temperature data from the temperature sensor and determine whether an amount of time since a heating cycle of an HVAC unit began is greater than or equal to a predetermined amount of time.

In response to determining that the amount of time since the heating cycle began is greater than or equal to the predetermined amount of time, the controller can determine whether a current temperature is less than or equal to a low threshold temperature. The low threshold temperature can be less than a target temperature. Alternatively, the low threshold temperature can be less than a low turn-on temperature. In response to determining that the current temperature is less than or equal to the low threshold temperature, the controller can determine whether a capacity of the HVAC unit at the end of the heating cycle is greater than a threshold capacity. In response to determining that the capacity of the HVAC unit at the end of the heating cycle is greater than the threshold capacity, the controller can adjust a response setting of the thermostat by a predetermined adjustment amount.

The response setting can be a gain setting of the controller and adjusting the response setting of the thermostat by the predetermined adjustment amount can include adjusting the gain setting of the controller by a fixed amount. Alternatively, adjusting the response setting of the thermostat by the predetermined adjustment amount can include adjusting the gain setting of the controller by an amount that is proportional to the amount that the capacity of the HVAC unit at the end of the heating cycle is greater than the threshold capacity.

The response setting can be a time setting of the controller. Adjusting the response setting of the thermostat by the predetermined adjustment amount can include adjusting the time setting of the controller by a fixed amount. Alternatively, adjusting the response setting of the thermostat by the predetermined adjustment amount can include adjusting the time setting of the controller by an amount that is proportional to the amount that the capacity of the HVAC unit at the end of the heating cycle is greater than the threshold capacity. The predetermined amount of time can be about two minutes.

In response to determining that the current temperature is less than or equal to the low threshold temperature, the controller can determine whether the current temperature at the end of the heating cycle is greater than or equal to a high overshoot temperature. In response to determining that the current temperature at the end of the heating cycle is greater than or equal to the high overshoot temperature, the controller can adjust the response setting of the thermostat by the predetermined adjustment amount. Adjusting the response setting of the thermostat by the predetermined adjustment amount can include adjusting the gain setting of the controller by an amount that is proportional to the amount that the current temperature at the end of the heating cycle is greater than the high overshoot temperature. Alternatively, adjusting the response setting of the thermostat by the predetermined adjustment amount can include adjusting the time setting of the controller by an amount that is proportional to the amount that the current temperature at the end of the heating cycle is greater than the high overshoot temperature.

The controller can be further configured to determine whether an amount of time since a cooling cycle of an HVAC unit began is greater than or equal to the predetermined amount of time. In response to determining that the amount of time since the cooling cycle began is greater than or equal to the predetermined amount of time, the controller can determine whether the current temperature is greater than or equal to a high threshold temperature. The high threshold temperature can be greater than the target temperature. Alternatively, the high threshold temperature can be greater than a high turn-on temperature. In response to determining that the current temperature is greater than or equal to the high threshold temperature, the controller can determine whether the capacity of the HVAC unit at the end of the cooling cycle is greater than the threshold capacity. In response to determining that the capacity of the HVAC unit at the end of the cooling cycle is greater than the threshold capacity, the controller can adjust a response setting of the thermostat by a predetermined adjustment amount.

In response to determining that the current temperature is less than or equal to the low threshold temperature, the controller can be configured to determine whether the current temperature at the end of the heating cycle is greater than or equal to a high overshoot temperature. In response to determining that the current temperature at the end of the heating cycle is greater than or equal to the high overshoot temperature, the controller can be configured to adjust the response setting of the thermostat (e.g., a gain setting of the controller or a time setting of the controller) by the predetermined adjustment amount.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

The disclosed technology relates generally to systems and methods for reducing temperature overshoot of a heating, ventilation, and air conditioning (HVAC) system. As will become apparent throughout this disclosure, the disclosed technology can determine when the gain or a time setting on a thermostat should be adjusted and then automatically adjust the gain or time setting to ensure the HVAC system properly heats and/or cools the ventilated space. The disclosed technology can be useful, for example, when the thermostat of an HVAC has been installed in a location that is subject to temperature changes that may not be representative of the temperature of the air in all or a substantial portion (e.g., the majority) of the ventilated space (e.g., when the thermostat is installed too closely to an element that could negatively impact the accuracy of a temperature measurement being representative of the temperature of the overall space, such as a location at or near a supply air vent, return air vent, door, window, or equipment). The disclosed technology can determine that the gain or time setting should be adjusted to prevent the system from overshooting the shutoff temperature and causing the air temperature within the ventilated space to be at an uncomfortable level.

Although certain examples of the disclosed technology are explained in detail herein, it is to be understood that other examples, embodiments, and implementations of the disclosed technology are contemplated. Accordingly, it is not intended that the disclosed technology is limited in its scope to the details of construction and arrangement of components expressly set forth in the following description or illustrated in the drawings. The disclosed technology can be implemented in a variety of examples and can be practiced or carried out in various ways. In particular, the presently disclosed subject matter is described in the context of being a system and method for automatically adjusting the gain on a thermostat of an HVAC system. The present disclosure, however, is not so limited, and can be applicable in other contexts. The present disclosure, for example and not limitation, can include other systems utilizing a thermostat such as automotive HVAC systems, water heater systems, industrial fluid heating or cooling systems, or any other system configured to heat or cool a fluid by utilizing a thermostat to control the temperature. Such implementations and applications are contemplated within the scope of the present disclosure. Accordingly, when the present disclosure is described in the context of being a system and method for automatically adjusting the gain or time setting on a thermostat of an HVAC system, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Although the term "air" is used throughout this specification, it is to be understood that other fluids may take the place of the term "air" as used herein. Therefore, although described as systems and methods for an HVAC system, it is to be understood that the system and methods described herein can apply to fluids other than air. Further, it is also to be understood that the term "air" can replace the term "fluid" as used herein unless the context clearly dictates otherwise.

As used herein, the term "target temperature" can be a temperature that is a preferred temperature of an occupant of the climate-controlled space (e.g., 72° F.), such as a user-inputted set point for the HVAC system. As will be appreciated, the HVAC system described herein can be configured to maintain a temperature of the air within the climate-controlled space based on the target temperature. In other words, the HVAC system will attempt to keep the temperature of the air within the climate-controlled space to within an acceptable range of the target temperature. Furthermore, the term "turn-on temperature" can be a temperature at which the thermostat will determine that the HVAC system should turn on to heat or cool the climate-controlled space (e.g., the temperature at which the thermostat determines that the air within the climate-controlled space is getting too cold (when in a heating mode) or too hot (when in a cooling mode)). Similarly, the term "turn-off temperature" can refer to a temperature at which the thermostat will determine that the HVAC system should turn off and cease heating or cooling the climate-controlled space (e.g., the temperature at which the thermostat determines that the air within the climate-controlled space is reaching an acceptable temperature).

Figure 1A:
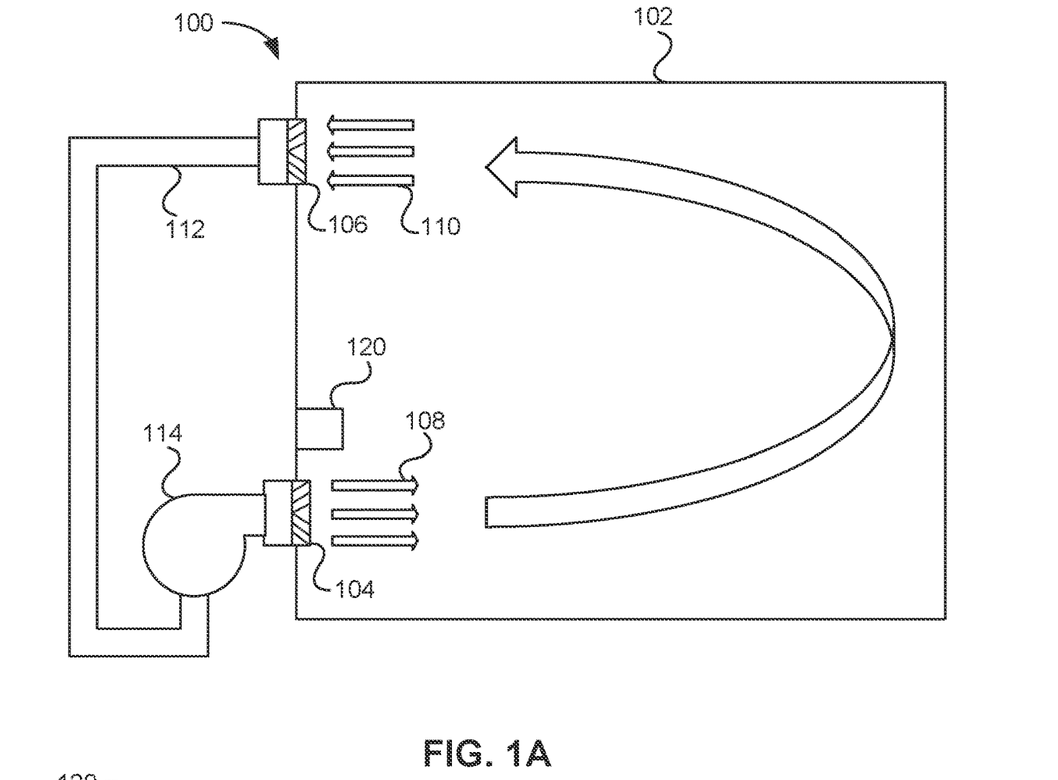
FIG. 1A illustrates an example HVAC system, in accordance with the disclosed technology.

Referring now to the drawings, in which like numerals represent like elements, examples of the present disclosure are herein described. FIG. 1A illustrates an example HVAC system 100, in accordance with the disclosed technology. The HVAC system 100 can be configured to control the temperature of air within a climate-controlled space 102 (e.g., a home, a commercial building, a storage unit, a vehicle, etc.) by circulating heated or cooled air from an HVAC unit 114, through a supply air vent 104, through the climate-controlled space 102, and then back to the HVAC unit 114 through a return air vent 106 and ductwork 112. The HVAC unit 114 can be any type of HVAC unit including, but not limited to, a split system, a hybrid split system, a mini-split system, a packaged heating and air system, a gas-fired furnace, a heat pump, and electric heater, an evaporative cooler, or any other type of HVAC unit that can heat and/or cool air circulated to the climate-controlled space 102. Thus, although described as an HVAC unit 114 throughout this disclosure, one of skill in the art will appreciate that the disclosed technology can include any system configured heat and/or cool air that is circulated through the climate-controlled space 102. Furthermore, although described herein as having ductwork 112, the HVAC system 100 can be a ductless HVAC system 100 having only a supply air vent 104 and a return air vent 106.

The HVAC system 100 can include a thermostat 120 that can be configured to detect a temperature of the air within the climate-controlled space 102 and output instructions to the HVAC unit 114 to supply either heated or cooled air to the climate-controlled space. In this way, the thermostat 120 can help to ensure the temperature of the air within the climate-controlled space is maintained within a comfortable temperature range. As described previously, the thermostat 120 can be installed on a wall of the climate-controlled space 102 or be otherwise installed in a location where the thermostat 120 can detect a temperature of the air within the climate-controlled space 102. As depicted in FIG. 1A, in some instances the thermostat 120 can be installed in a location that is proximate the supply air vent 104. When this is the case, the thermostat 120 can sometimes detect a temperature of the supply air 108 delivered from the supply air vent 104 that is not an accurate reflection of the temperature of the air within the remainder of the climate-controlled space 102. In other instances, the thermostat 120 can be installed in any other location that can negatively impact the accuracy of the thermostat's temperature measurements being representative of the temperature of the overall space 102 (e.g., a location proximate the return air vent 106, proximate a door, proximate a window, or at another location that is subject to occasionally causing air proximate the thermostat 120 to have a temperature that is different from all or a substantial portion (e.g., the majority) of the air within the climate-controlled space 102). When the thermostat 120 is installed in one such location subject to temperature fluctuations that are not representative of the overall space, the thermostat 120 can cause the HVAC unit 114 to supply a greater amount of heated or cooled air than is necessary, as described previously. Thus, when the thermostat 120 is installed in a less than ideal location, the thermostat 120 can sometimes return non-representative temperature values, causing the HVAC unit 114 to overshoot the shutoff temperature by several degrees Fahrenheit and thereby creating an uncomfortable climate for an occupant of the climate-controlled space 102.

Figure 1B:
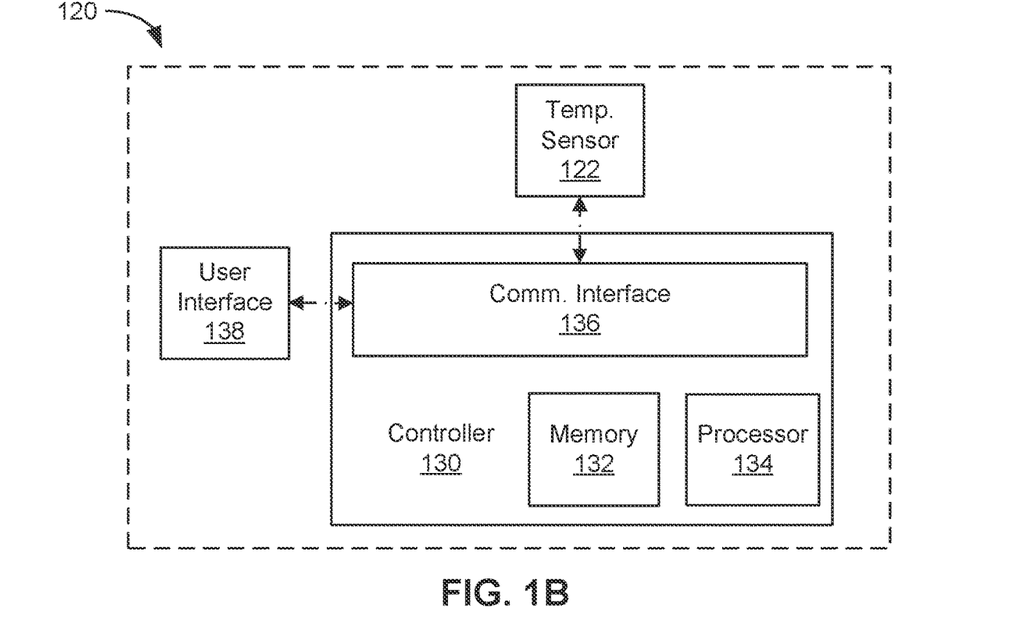
FIG. 1B illustrates an example thermostat of the HVAC system, in accordance with the disclosed technology.

FIG. 1B illustrates an example thermostat 120 of the HVAC system 100, in accordance with the disclosed technology. The thermostat 120 can include a temperature sensor 122 and a controller 130 configured to receive temperature data from the temperature sensor 122. The temperature sensor 122 can be integrated with the thermostat 120 as shown in FIG. 1B, or the temperature sensor can be remote from the thermostat 120. No matter the configuration, the temperature sensor 122 can be configured to detect a temperature of the air proximate the temperature sensor 122 and output temperature data to the controller 130. As will be appreciated by one of skill in the art with the benefit of this disclosure, if the temperature sensor 122 is installed in a location where it can detect a temperature of air that is not representative of all or a substantial portion (e.g., the majority) of the air within the climate-controlled space 102, the temperature sensor 122 will output data to the controller 130 that may inaccurately represent the temperature of the air within the climate-controlled space 102. Accordingly, the methods and systems described herein are configured to reduce a temperature overshoot that can occur as a result of the temperature sensor 122 outputting temperature data to the controller 130 that is not representative of the temperature of all or a substantial portion (e.g., the majority) of the air within the climate-controlled space 102.

The temperature sensor 122 can be any type of temperature sensor capable of detecting the temperature of the air proximate the temperature sensor 122 and providing temperature data indicative of the air temperature to the controller 130. For example, the temperature sensor 122 can be a thermocouple, a resistor temperature detector, a thermistor, an infrared sensor, a semiconductor, or any other type of sensor which would be appropriate for a given use or application.

The controller 130 of the thermostat 120 can have a memory 132, a processor 134, and a communication interface 136. The controller 130 can be a computing device configured to receive data, determine actions based on the received data, and output a control signal instructing one or more components of the HVAC system 100 to perform one or more actions. The controller 130 can be integrated with the thermostat 120 in the same housing or enclosure. One of skill in the art, however, will appreciate that the controller 130 can be installed in any location, provided the controller 130 is in communication with at least some of the components of the HVAC system 100 (e.g., at least the temperature sensor 122 and the HVAC unit 114). For example, the controller 130 can be remote from the temperature sensor 122 and from the user interface 138. Furthermore, the controller 130 can be configured to send and receive wireless or wired signals and the signals can be analog or digital signals. The wireless signals can include Bluetooth™, BLE, WiFi™ ZigBee™, infrared, microwave radio, or any other type of wireless communication as may be suitable for the particular application. The hard-wired signal can include any directly wired connection between the controller 130 and the other components. Alternatively, the components can be powered directly from a power source and receive control instructions from the controller 130 via a digital connection. The digital connection can include a connection such as an Ethernet or a serial connection and can utilize any suitable communication protocol for the application such as Modbus, fieldbus, PROFIBUS, SafetyBus p, Ethernet/IP, or any other suitable communication protocol for the application. Furthermore, the controller 130 can utilize a combination of wireless, hard-wired, and analog or digital communication signals to communicate with and control the various components. One of skill in the art will appreciate that the above configurations are given merely as non-limiting examples and the actual configuration can vary depending on the particular application.

The controller 130 can include a memory 132 (e.g., a computer-readable medium) that can store a program and/or instructions associated with the functions and methods described herein and can include one or more processors 134 configured to execute the program and/or instructions. The memory 132 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processing techniques or methods described herein can be implemented as a combination of executable instructions and data within the memory.

The controller 130 can also have a communication interface 136 for sending and receiving communication signals between the various components. Communication interface 136 can include hardware, firmware, and/or software that allows the processor(s) 134 to communicate with the other components via wired or wireless networks, whether local or wide area, private or public, as known in the art. Communication interface 136 can also provide access to a cellular network, the Internet, a local area network, or another wide-area network as suitable for the particular application.

Additionally, the controller 130 can have or be in communication with a user interface 138 for displaying system information and receiving inputs from a user. The user interface 138 can be integrated with the controller 130 in a housing or enclosure of the thermostat 120 or be a remotely controlled device such as a mobile device. The user, for example, can view system data on the user interface 138 and input data or commands to the controller 130 via the user interface 138. For example, the user can view temperature settings, temperature threshold settings, gain settings, time settings, etc. on the user interface 138 and provide inputs to the controller 130 via the user interface 138 to change any of the settings.

The controller 130 can be configured to receive temperature data from the temperature sensor 122, determine actions based on the detected temperature and stored temperature setpoints, and output control signals to the HVAC unit 114. For example, as will be described in greater detail herein, the controller 130 can be configured to determine whether to adjust the gain setting stored in the memory 132 based at least in part on data received from the temperature sensor 122, the HVAC unit 114, and/or other components of the HVAC system 100. As will become apparent throughout this disclosure, the controller 130 can be configured to control the HVAC system 100 in accordance with one or more of the example methods described in relation to FIG. 2 and FIG. 3.

Figure 2:
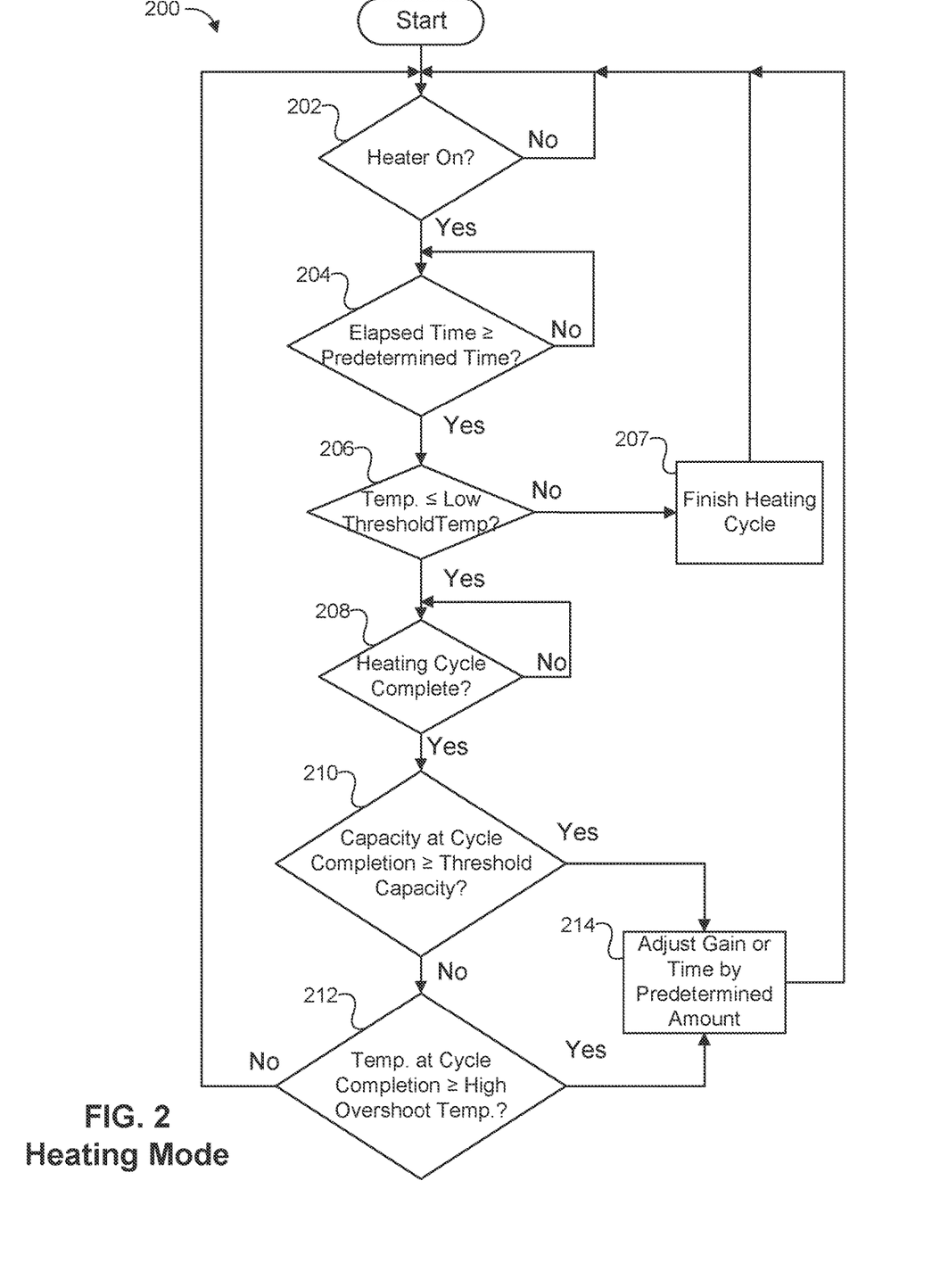
FIG. 2 is a logic diagram illustrating an example method of automatically adjusting a response setting of a thermostat of an HVAC system when in a heating mode, in accordance with the disclosed technology.

FIG. 2 is a logic diagram illustrating an example method of automatically adjusting a response setting (e.g., the gain, a time setting) of the thermostat 120 of the HVAC system 100 when in a heating mode, in accordance with the disclosed technology. The method 200 described herein can reduce the amount of temperature overshoot which can occur as a result of the thermostat 120 being installed in a location where it can detect a temperature of the air that is not representative of all or a substantial portion (e.g., the majority) of the air within the climate-controlled space 102. For example, the method 200 can help to reduce the amount of temperature overshoot that may occur as a result of the thermostat 120 being installed too closely to the supply air vent 104 (e.g., as shown and described in relation to FIG. 1A), the return air vent 106, a door, a window, etc. Thus, the method 200 shown and described in relation to FIG. 2 can help ensure the HVAC unit 114 does not supply too much heated air and, therefore, overheat the climate-controlled space 102.

The method 200 of operating the HVAC system 100 can include starting a logic sequence by receiving a start signal or by initiating the method 200 (e.g., as power is received to the controller 130). The method 200 can include determining 202 whether the heater (e.g., HVAC unit 114) is on. For example, determining 202 whether the heater is on can include determining whether a start signal has been sent by the thermostat 120 to the HVAC unit 114, detecting that the heater has begun to heat the air, detecting that a furnace of the heater has ignited, or the like. In other words, determining 202 whether the heater is on can include determining whether the heater has been instructed to heat, is beginning to heat, and/or is currently heating, the air within the HVAC unit to deliver the heated air to the climate-controlled space 102. If the heater is not on, the method 200 can include continuing to determine 202 if the heater is on (e.g., continuously, at predetermined intervals).

If the heater is on, the method 200 can include determining 204 whether an elapsed time since the heater turned on is greater than or equal to a predetermined time. For example, the method 200 can include measuring an amount of time since the heater was turned on and comparing the measured time to a predetermined time (i.e., a predetermined amount of time). The predetermined time can be, for example, a predetermined amount of time after which the HVAC unit 114 is likely to begin circulating the air to the climate-controlled space 102. For example, if the HVAC unit 114 is likely to begin circulating the heated air to the climate-controlled space 102 within two minutes, the predetermined time can be about two minutes. In this way, the method 200 can ensure that a temperature detected after the predetermined time is representative of the temperature of the air proximate the thermostat 120 after the HVAC unit 114 has begun to circulate the heated air to the climate-controlled space 102. The predetermined time, for example, can be thirty seconds, one minute, two minutes, three minutes, four minutes, five minutes, or any greater or lesser time depending on the particular configuration. If the elapsed time is not greater than or equal to the predetermined time, the method 200 can include continuing to determine 204 whether the elapsed time is greater that or equal to the predetermined time (e.g., continuously, at predetermined intervals).

If the elapsed time is greater than or equal to the predetermined time, the method 200 can include determining 206 whether the current temperature (e.g., the temperature of the air proximate the thermostat 120 at the time the temperature of the air is detected) is less than or equal to a low threshold temperature. In other words, the method 200 can include checking a temperature of the air proximate the thermostat 120 at a time after the heater has been able to operate for the predetermined amount of time. If the current temperature is less than or equal to the low threshold temperature, this can be an indication that the thermostat 120 can be installed in a location that is not representative of the temperature of all or a substantial portion (e.g., the majority) of the air within the climate-controlled space 102. For example, the current temperature can be less than or equal to the low threshold temperature as a result of cool air from an air duct being directed toward the thermostat 120 from the supply air vent 104 before the heated air is supplied from the air duct.

The low threshold temperature can be a fixed temperature such as a temperature that is a predetermined amount less than the target temperature (e.g., 5° F. below the target temperature (67° F. if the target temperature is 72° F.), 3° F. below the target temperature (69° F. if the target temperature is 72° F.), etc.) or a predetermined amount less than the low turn-on temperature (e.g., 5° F. below the low turn-on temperature (65° F. if the low turn-on temperature is 70° F., 3° F. below the low turn-on temperature (67° if the low turn-on temperature is 70° F.), etc.). Alternatively, the low threshold temperature can be variable and can be based on the current temperature at the time the heater is first turned on. For example, if the current temperature at the time the heater is first turned on was 65° F., the low threshold temperature can be 3° F. below the current temperature at the time the heater first turned on (i.e., 62° F.). To illustrate, a target temperature of a thermostat 120 may be set to 72° F. with a turn-on temperature of 70° F. In some cases, the HVAC system 100 may be turned on with the temperature of the air in the climate-controlled space 102 being less than the turn-on temperature (e.g., the temperature of the air in the climate-controlled space 102 can be at 68° F. when the HVAC system 100 is first turned on for the winter season). When the HVAC system 100 is turned on and the current temperature is less than the turn-on temperature, the thermostat 120 will monitor whether the air temperature continues to fall to the low threshold temperature (e.g., 62° F.) after the predetermined time. In other words, if the temperature continues to fall more than a predetermined amount (3° F. in this example) after the heater has turned on, this can be an indication that the thermostat 120 is installed in a less than ideal location. If the current temperature is greater than the low threshold temperature, the method can include finishing the heating cycle 207 and returning to the beginning of the method 200 to determine 202 if the heater is on.

If the temperature is less than or equal to the low threshold temperature, the method 200 can include determining 208 whether the heating cycle is complete. Determining 208 whether the heating cycle is complete can include determining whether the heater has completed a heating cycle and has shut down. Alternatively, or in addition, the determining 208 whether the heating cycle is complete can include determining whether the current temperature is greater than or equal to the turn-off temperature. If the heating cycle is not complete, the method 200 can include continuing to check whether the heating cycle is complete (e.g., continuously, at predetermined intervals).

If the heating cycle is complete, the method 200 can include determining 210 whether the capacity of the HVAC unit 114 at the time the heating cycle was completed is greater than or equal to a threshold capacity. The threshold capacity can be a predetermined amount or percentage of capacity that is greater than the minimum capacity (e.g., 20%, 25%, 30%, 50%, etc. above the minimum capacity of the HVAC unit 114). The capacity can be a measure of the total heat output of the HVAC unit 114 when it is operating.

As will be appreciated by one of skill in the art, as an HVAC unit 114 approaches the turn-off temperature under normal conditions, the HVAC unit 114 will begin to ramp down the heat output of the HVAC unit 114 (e.g., the total capacity at which the HVAC unit is operating) to avoid overheating the climate-controlled space 102 once the HVAC unit 114 reaches the turn-off temperature. For example, if the HVAC unit 114 has a target temperature of 72° F. and a turn-off temperature of 73° F., the HVAC unit 114 can be configured to begin ramping down the capacity of the HVAC unit 114 to a minimum once the current temperature reaches 72.5° F. such that the HVAC unit 114 will not overshoot the shut off temperature by several degrees. Thus, if the capacity of the HVAC unit 114 is greater than the threshold capacity at the time the HVAC unit 114 shut down, this can be an indication that the HVAC unit 114 was outputting too much heat capacity, potentially as a result of the thermostat 120 detecting a temperature of the air proximate the thermostat 120 that was not representative of all or a substantial portion (e.g., the majority) of the air within the climate-controlled space 102.

If the controller 130 determines 210 that the capacity of the HVAC unit is greater than or equal to the threshold capacity, the method 200 can include adjusting 214 a response setting of the thermostat 120 by a predetermined amount (e.g., a gain setting or a time setting of the thermostat), as will be described in greater detail herein, and returning to the beginning of the method 200 to determine 202 whether the heater is on. If the controller 130 determines that the capacity of the HVAC unit is less than the threshold capacity, the method 200 can include determining 212 whether the current temperature at the time the heating cycle was completed is greater than or equal to a high overshoot temperature. The high overshoot temperature can be a predetermined temperature that is indicative of the HVAC unit 114 providing too much heated air to the climate-controlled space 102. For example, if the turn-off temperature is 73° F., the high overshoot temperature can be 75° F. or some other predetermined temperature suitable for the application. In other words, if the current temperature at the end of the heating cycle (or some time after the heating cycle has completed) is greater than the high overshoot temperature, it is possible that the thermostat 120 detected a temperature during the heating cycle that was not representative of the temperature of all or a substantial portion (e.g., the majority) of the air within the climate-controlled space 102 (hence, why the HVAC unit 114 provided too much heated air).

If the controller 130 determines that the current temperature at the end of the heating cycle is less than the high overshoot temperature, the method 200 can include returning to the beginning and determining 202 whether the heater is on. If the controller 130 determines that the current temperature at the end of the heating cycle is greater than or equal to the high overshoot temperature, the method 200 can include adjusting 214 a response setting of the thermostat 120 by a predetermined amount (e.g., a gain setting or a time setting of the thermostat) and returning to the beginning and determining 202 whether the heater is on.

As will be appreciated by one of skill in the art, some controllers of thermostats are equipped with proportional, integral, derivative (PID) controllers or other similar control schemes that include a gain setting to control a response of the thermostat and HVAC unit (e.g., an "anticipator" setting). By adjusting the gain in a first direction (i.e., increasing the gain value), the controller 130 will cause the HVAC unit 114 to respond more quickly to a temperature change. Conversely, by adjusting the gain in a second direction (i.e., decreasing the gain value), the controller 130 will cause the HVAC unit 114 to respond more slowly to a temperature change. By adjusting the gain and continuing to check the response to the gain adjustment, the disclosed technology can help to prevent temperature overshoot by causing the controller 130 to respond more slowly to a temperature change thereby preventing the controller 130 from outputting instructions to increase the heating capacity if a low temperature is detected soon after the HVAC unit 114 has begun to supply heated air.

On the other hand, some HVAC units include a controller 130 of the thermostat 120 that is configured to adjust a time setting of the various stages of the HVAC unit 114 (e.g., discrete staged equipment having multiple, discrete heating or cooling stages) or individual heating or cooling cycles. By adjusting the time setting (i.e., the length of time between each discrete heating or cooling stage or the length of time between each heating or cooling cycle), the controller 130 can similarly help to ensure the HVAC unit 114 does not provide too much heated air to the climate-controlled space 102. For example, if the thermostat 120 detects a low temperature soon after the HVAC unit 114 has begun to supply heated air, adjusting the time setting to lengthen the run time of a lower capacity discrete heating stage can, in turn, shorten a run time of a higher capacity discrete heating stage, thereby helping to prevent the HVAC unit 114 from overheating the climate-controlled space 102. Furthermore, increasing a time between each heating or cooling cycle can help to prevent the HVAC unit 114 from providing heated (or cooled) air too frequently and ultimately overheating (or overcooling) the climate-controlled space 102.

Adjusting 214 the response setting of the thermostat 120 can include adjusting the response setting by a predetermined amount. For example, if the gain setting on the thermostat 120 has a range of values from 1 to 10, the controller 130 can adjust the gain by a value of 1. As another example, if the gain setting has a range from 0-100%, the controller 130 can adjust the gain by a value of 5% or some other predetermined value suitable for the application. Similarly, if the controller 130 adjusts a time setting, the controller 130 can adjust the time setting by 1 second, 5 seconds, 10 seconds, 30 seconds, 1 minute, 2 minutes, 5 minutes, or any other predetermined amount of time suitable for the application. Alternatively, the controller 130 can adjust the response setting by an amount proportional to the amount of overshoot observed. For example, the controller 130 can adjust the response setting by the amount that the capacity of the HVAC unit 114 at the end of the heating cycle is greater than the threshold capacity. Similarly, the controller 130 can adjust the response setting by an amount that is proportional to amount that the current temperature at the end of the heating cycle is greater than the high overshoot temperature. In this way, the controller 130 can adjust the gain or time setting in greater amounts or smaller amounts as would be appropriate for the particular situation. Furthermore, as will be appreciated by one of skill in the art, adjusting the gain can include increasing or decreasing the gain as would be appropriate for the particular situation. Similarly, adjusting the time setting can include increasing or decreasing a length of time between one or more stages as would be appropriate for the particular situation.

Figure 3:
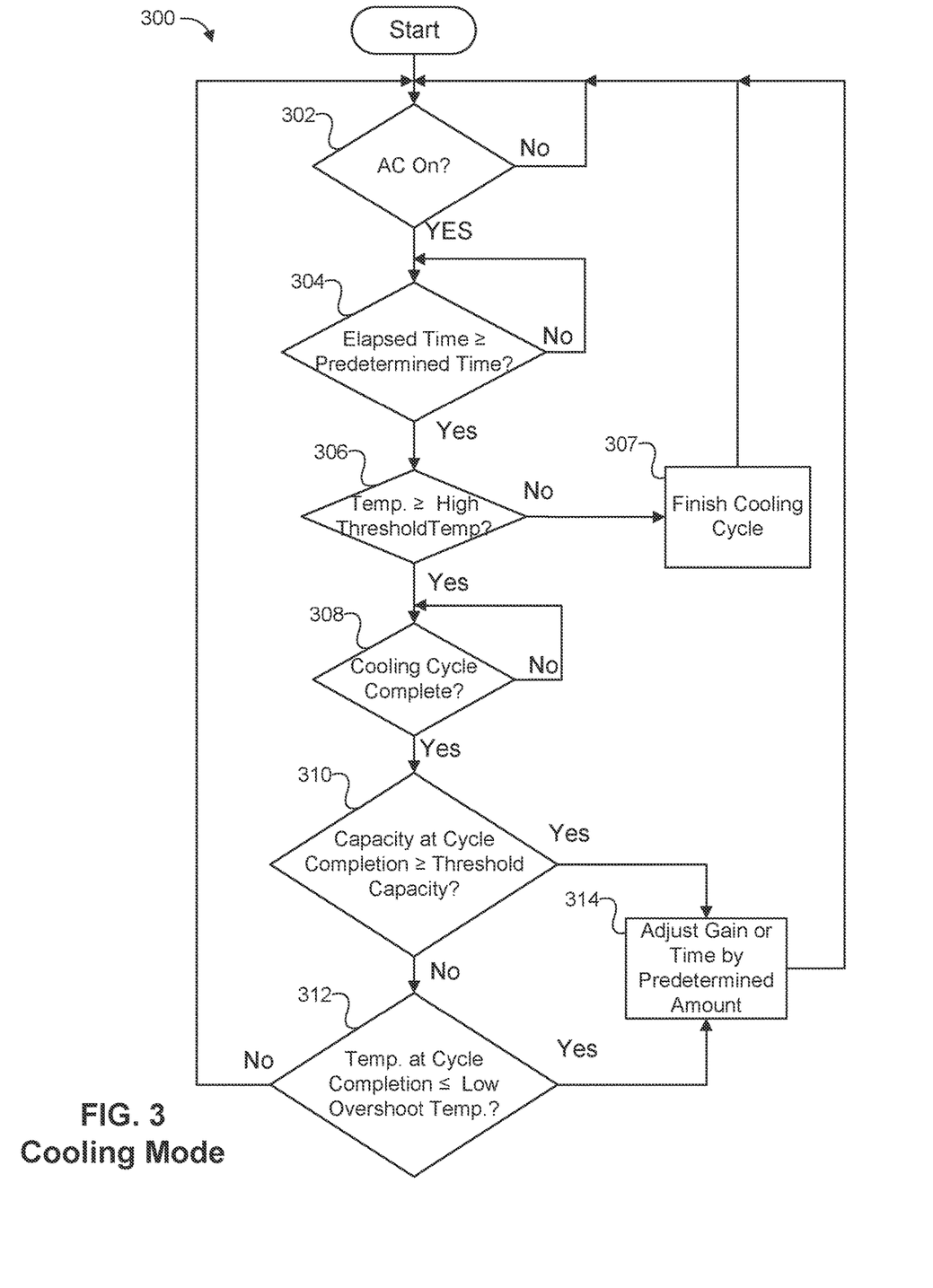
FIG. 3 is a logic diagram illustrating an example method of automatically adjusting a response setting of a thermostat of an HVAC system when in a cooling mode, in accordance with the disclosed technology.

FIG. 3 is a logic diagram illustrating an example method 300 of automatically adjusting a response setting of the thermostat 120 of the HVAC system 100 when in a cooling mode, in accordance with the disclosed technology. As will be appreciated, the method 300 can be substantially similar to the method 200 except that the various elements correspond to a cooling cycle rather than a heating cycle. For example, the method 300 can include determining 302 whether the air conditioning (AC) is turned on. For example, determining 302 whether the AC is on can include determining whether a start signal has been sent by the thermostat 120 to the HVAC unit 114, detecting that the AC has begun to cool the air, detecting whether a compressor of a refrigerant cycle is operating, etc. In other words, determining 302 whether the AC is on can include determining whether the AC has been instructed to cool, is beginning to cool, and/or is currently cooling, the air within the HVAC unit to deliver the cooled air to the climate-controlled space 102. If the AC is not on, the method 300 can include continuing to determine 302 if the AC is on.

If the AC is on, the method 300 can include determining 302 whether an elapsed time since the AC has turned on is greater than or equal to a predetermined time. Determining 302 whether an elapsed time since the AC has turned on is greater than or equal to a predetermined time can include all of the same steps and/or features described in relation to feature 202 of method 200. Furthermore, the predetermined time can be the same as, or different from, the predetermine time described in relation to feature 202 of method 200.

The method 300 can further include determining 306 whether the current temperature is greater than or equal to a high threshold temperature. For example, rather than the thermostat 120 detecting a low temperature of air delivered from the supply air vent 104, as described in relation to feature 206, the thermostat 120 can detect a high temperature of the air delivered from the supply air vent 104 (e.g., when stagnant warm air is first delivered from an air duct that has passed through a warm attic before the cooled air is delivered). Similar to feature 206, the high threshold temperature can be a fixed temperature based on either the target temperature or the turn-on temperature, or the high threshold temperature can be variable and be based on the current temperature at the time the HVAC unit 114 is turned on. As will be appreciated by one of skill in the art, unlike the low threshold temperature described in relation to feature 206, the high threshold temperature will be a temperature that is greater than the target temperature, the turn-on temperature, and/or the current temperature depending on the particular configuration. If the current temperature is less than the high threshold temperature, the method 300 can include finishing 307 the cooling cycle and once again determining 302 whether the AC is on.

If the current temperature is greater than or equal to the high threshold temperature, the method 300 can include determining 308 whether the cooling cycle is complete. Determining 308 whether the cooling cycle is complete can include determining whether the AC has completed a cooling cycle and has shut down. Alternatively, or in addition, determining 308 whether the cooling cycle is complete can include determining whether the current temperature is less than or equal to the turn-off temperature. If the cooling cycle is not complete, the method 300 can include continuing to check whether the cooling cycle is complete (e.g., continuously, at predetermined intervals).

If the cooling cycle is complete, the method 300 can include determining 310 whether the capacity of the HVAC unit 114 at the time the cooling cycle was completed is greater than or equal to the threshold capacity. Determining 310 whether the capacity of the HVAC unit 114 at the time the cooling cycle was completed is greater than or equal to the threshold capacity can be substantially similar and include all of the same features described in relation to feature 210 of method 200 except all features will be modified to apply to a cooling mode. For example, under normal conditions, the AC unit will begin to ramp down as the turn-off temperature is approached such that the AC unit will operate at a minimum capacity at or near the time of shutdown.

If the capacity of the HVAC unit 114 at the time the cooling cycle is completed is greater than or equal to the threshold capacity, the method 300 can include adjusting 314 a response setting of the controller 130 by a predetermined amount. Adjusting 314 the response setting can be substantially similar to and include all of the same features described in relation to adjusting 214 the response setting of method 200.

If the capacity of the HVAC unit 114 is less than the threshold capacity, the method 300 can include determining 312 whether a current temperature at the time the cooling cycle was completed is less than or equal to a low overshoot temperature. Similar to, but different from, feature 212 of method 200, determining 312 whether a current temperature at the time the cooling cycle was completed is less than or equal to a low overshoot temperature can include determining whether the HVAC unit 114 output too much cool air and, therefore, cooled the air within the climate-controlled space too much. The low overshoot temperature can be a predetermined temperature that is indicative of the HVAC unit 114 providing too much cooled air to the climate-controlled space 102. For example, if the turn-off temperature is 70° F., the low overshoot temperature can be 68° F. or some other predetermined temperature suitable for the application. In other words, if the current temperature at the end of the cooling cycle (or sometime after the cooling cycle has completed) is less than the low overshoot temperature, it is possible that the thermostat 120 detected a temperature during the cooling cycle that was not representative of the temperature of all or a substantial portion (e.g., the majority) of the air within the climate-controlled space 102 (hence, why the HVAC unit 114 provided too much cooled air).

If the temperature at the end of the cooling cycle is greater than the low overshoot temperature, the method 300 can include returning to the beginning of method 300 and determining 302 whether the AC is on. If the temperature at the end of the cooling cycle is less than or equal to the low overshoot temperature, the method 300 can include adjusting 314 the response setting by the predetermined amount as described previously.

As will be appreciated, the methods 200 and 300 just described can be varied in accordance with the various elements and examples described herein. That is, methods in accordance with the disclosed technology can include all or some of the steps described above and/or can include additional steps not expressly disclosed above. Further, methods in accordance with the disclosed technology can include some, but not all, of a particular step described above. Further still, various methods described herein can be combined in full or in part. That is, methods in accordance with the disclosed technology can include at least some elements or steps of a first method (e.g., method 200) and at least some elements or steps of a second method (e.g., method 300).

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A thermostat for a heating, ventilation, and air conditioning (HVAC) system comprising:
    a controller configured to:
       determine temperature data;
       determine that an amount of elapsed time since a heating cycle of an HVAC unit began is greater than or equal to a predetermined amount of time;
       in response to determining that the amount of elapsed time is greater than or equal to the predetermined amount of time, determine that a first current temperature is less than or equal to a low threshold temperature, wherein the low threshold temperature is less than a target temperature; and
       in response to determining that the first current temperature is less than or equal to the low threshold temperature, adjust a response setting of the thermostat by a predetermined adjustment amount.

2. The thermostat of claim 1, wherein the controller is further configured to:
    prior to adjusting the response setting, determine that a capacity of the HVAC unit at an end of the heating cycle is greater than a threshold capacity.

3. The thermostat of claim 1, wherein the predetermined adjustment amount is a first predetermined adjustment amount, and wherein the controller is further configured to:
    determine that a second current temperature at an end of the heating cycle is greater than or equal to a high overshoot temperature; and
    adjust the response setting of the thermostat by a second predetermined adjustment amount.

4. The thermostat of claim 3, wherein adjusting the response setting of the thermostat by the second predetermined adjustment amount comprises adjusting a gain setting of the controller by an amount that is proportional to an amount that the second current temperature is greater than the high overshoot temperature.

5. The thermostat of claim 3, wherein adjusting the response setting of the thermostat by the second predetermined adjustment amount comprises adjusting a time setting of the controller by an amount that is proportional to an amount that the second current temperature is greater than the high overshoot temperature.

6. The thermostat of claim 1, wherein adjusting the response setting of the thermostat by the predetermined adjustment amount comprises adjusting a time setting of the controller by an amount that is proportional to an amount that a capacity of the HVAC unit at an end of the heating cycle is greater than a threshold capacity.

7. The thermostat of claim 1, wherein adjusting the response setting of the thermostat by the predetermined adjustment amount comprises adjusting a time setting of the controller by a fixed amount.

8. The thermostat of claim 1, wherein adjusting the response setting of the thermostat by the predetermined adjustment amount comprises adjusting a gain setting of the controller by an amount that is proportional to an amount that a capacity of the HVAC unit at the end of the heating cycle is greater than a threshold capacity.

9. The thermostat of claim 1, wherein adjusting the response setting of the thermostat by the predetermined adjustment amount comprises adjusting a gain setting of the controller by a fixed amount.

10. The thermostat of claim 1, further comprising:
    a temperature sensor configured to detect a temperature of air proximate the thermostat.

11. A method comprising:
    i. determining, by a controller of an HVAC system, that an air conditioning unit is operational for a threshold length of time;
    ii. determining, by the controller at a first time interval using a temperature sensor coupled to the HVAC system, that a first temperature measurement is greater than a high temperature threshold;
    iii. determining, by the controller, that a cooling cycle of the air conditioning unit during the first time interval is complete;
    iv. determining, by the controller, that a capacity of the HVAC system is greater than a threshold capacity;
    v. adjusting, by the controller, a setting of the HVAC system by a predetermined amount;
    vi. determining, by the controller at a second time interval, that a cooling cycle during the second time interval is incomplete; and
    vii. operating, by the controller, the air conditioning unit to complete the cooling cycle during the second time interval.

12. The method of claim 11, further comprising:
    determining, at a third time interval, that a second temperature measurement is less than the high temperature threshold; and
    causing the air conditioning unit to complete the cooling cycle during the third time interval.

13. The method of claim 11, further comprising:
    determining, at a third time interval, that the capacity of the HVAC system is less than the threshold capacity; and
    determining that a second temperature measurement after completion of the cooling cycle is less than a low overshoot temperature setting.

14. The method of claim 13, further comprising:
causing a gain setting to be adjusted by a predetermined amount.

15. A method comprising:
i. determining, by a controller of an HVAC system that a heating unit is operational for a threshold length of time;
ii. determining, by the controller at a first time interval and using a temperature sensor coupled to the HVAC system, that a first temperature measurement is less than a low temperature threshold;
iii. determining, by the controller, that a heating cycle of the air conditioning unit during the first time interval is complete;
iv. determining, by the controller, that a capacity of the HVAC system is greater than a threshold capacity;
v. adjusting, by the controller, a setting of the HVAC system to be adjusted by a predetermined amount;
vi. determining, by the controller at a second time interval, that a heating cycle during the second time interval is incomplete; and
vii. operating, by the controller, the heating unit to complete the heating cycle during the second time interval.

16. The method of claim 15, further comprising:
determining, at a third time interval, that a second temperature measurement is greater than the low temperature threshold; and
causing the heating unit to complete a heating cycle during the third time interval.

17. The method of claim 15, further comprising:
determining, at a third time interval, that the capacity of the HVAC system is less than the threshold capacity; and
determining that a temperature after completion of the heating cycle is greater than a high overshoot temperature setting.

18. The method of claim 17, further comprising:
adjusting a gain setting of the HVAC system by a predetermined amount.

* * * * *